United States Patent [19]
Kaemmerer et al.

[11] Patent Number: 5,488,697
[45] Date of Patent: Jan. 30, 1996

[54] PROBLEM STATE MONITORING SYSTEM

[75] Inventors: William F. Kaemmerer, Minneapolis, Minn.; James R. Allard, Brookline, Mass.

[73] Assignee: Honeywell Inc., Minneapolis, Minn.

[21] Appl. No.: 208,065

[22] Filed: Mar. 8, 1994

Related U.S. Application Data

[60] Continuation of Ser. No. 898,642, Jun. 15, 1992, abandoned, which is a division of Ser. No. 433,401, Nov. 7, 1989, Pat. No. 5,193,143, which is a continuation-in-part of Ser. No. 363,374, Jun. 2, 1989, abandoned, which is a continuation of Ser. No. 143,898, Jan. 12, 1988, abandoned.

[51] Int. Cl.$^6$ .................................................. G06F 15/00
[52] U.S. Cl. .............................. 395/51; 395/911; 395/914
[58] Field of Search ............................. 395/51, 911, 914, 395/915; 371/15.1; 364/550, 551.01

[56] References Cited

U.S. PATENT DOCUMENTS

| | | | |
|---|---|---|---|
| 4,462,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 5,018,075 | 5/1991 | Ryan et al. | 364/513 |
| 5,161,158 | 11/1992 | Chakravarty et al. | 371/15.1 |

OTHER PUBLICATIONS

Sangwine, S. J., "Fault Diagnosis in Combinational Digital Circuits Using a Backtrack Algorithm to Generate Fault Location Hypotheses," IEEE Proceedings, vol. 135 (6), Dec. 1988, 247–252.
Chemical Plant Fault Dioagnosis Using Expert System Technology; Kowan; IFAC; Kyoto, Japan; Sep./Oct. 1986.
Expert Systems in On–Line Process Control; Moore et al; Expert Systems in Process Control; pp. 839–867; Jul. 6, 1987.
A Continuous Real–Time Expert System for Computer Operations; Ennis et al; pp. 14–27; IBM J. Res. Develop. vol. 30, No. 1; Jan 1986.

*Primary Examiner*—Robert W. Downs
*Attorney, Agent, or Firm*—John G. Shudy, Jr.; Paul H. McDowall

[57] ABSTRACT

The invention relates to a problem-state monitoring system which includes an automated reasoning technique for providing moment-by-moment advice concerning the operation of a process. The reasoning technique involves the representation of states a problem can attain during the problem solving process which provides greater flexibility for the monitoring and advisory functions.

1 Claim, 9 Drawing Sheets

PSMS STATE TRANSITIONS FROM CURRENT STATE TO NEW STATE

| RESULTS OF TRANSITION TEST* | NIL | PEND. | DIAG. | READY | NOREM. | RESOL. | UNCLE |
|---|---|---|---|---|---|---|---|
| PROBLEM REMEDIED [A] | NIL | RESOL. | RESOL. | RESOL. | RESOL. | NIL | RESOL. |
| NEW DIRECT DESCENDENT [B] | PEND. | PEND. | PEND. | PEND. | PEND. | PEND. | NIL |
| SOME DESC. NOT CONF. OR REJ. [C] | ** | PEND. | DIAG. | ** | ** | ** | ** |
| CONFIRMED=NIL REMEDY EXISTS [D] | ** | READY | ** | READY | ** | ** | ** |
| CONFIRMED=NIL NO REMEDY KNOWN [E] | ** | NOREM. | ** | NOREM. | UNCLE | ** | ** |
| A CONFIRMED DESC. NOT YET FIXED [F] | ** | DIAG. | DIAG. | ** | ** | ** | ** |
| SOME CONF. CAUSE CAN'T BE FIXED [G] | ** | ** | NOREM. | ** | UNCLE | ** | ** |
| CONF. DESC. FIXED REMEDY EXISTS [H] | ** | ** | READY | READY | ** | ** | ** |
| CONF. DESC. FIXED NO REMEDY EXISTS [I] | ** | ** | NOREM. | NOREM. | UNCLE | ** | ** |

\* FOR AN INTERPRETATION OF THE ROW LABELS, SEE THE TEXT.
\*\* EMPTY CELLS ARE UNREACHABLE STATE/CONDITION COMBINATIONS.

Fig. 1

THE AUGMENTED TRANSITION NETWORK OF THE PROBLEM STATUS MONITORING SYSTEM

AN EXAMPLE OF A PROBLEM SEARCH SPACE

FLOWCHART SHOWING HOW A PRIOR ART INFERENCE ENGINE WOULD MAKE USE OF THE PROBLEM STATE TRANSITION NETWORK OF THE INVENTION AS A SUBROUTINE

PROBLEM STATE MONITORING SYSTEM

This is a continuation of application Ser. No. 07/898,642, filed Jun. 15, 1992, now abandoned, which was a divisional of application Ser. No. 07/433,401, filed Nov. 7, 1989, now issued as U.S. Pat. No. 5,193,143, issued on Mar. 9, 1993 which was a continuation-in-part of application Ser. No. 07/363,374, filed Jun. 2, 1989, now abandoned, which was a continuation of original application Ser. No. 07/143,898, filed Jan. 12, 1988, now abandoned.

The invention relates to an automated reasoning technique for providing moment-by-moment advice concerning the operation of a process.

INTRODUCTION

There are many potential practical applications for a reasoning technique enabling a knowledge-based system to provide continuous "coaching" to the operators of a complex device or process. For example, manufacturing operations might benefit from advisory systems providing operators with continuous assistance in monitoring and troubleshooting process behavior. Similarly, computer installations might provide better service by using expert systems to assist operators in managing the systems' performance. However, the goal of continuously providing a user with operational advice, as well as problem diagnoses, makes unique demands on the reasoning technique to be employed. Such an advisory system must not only function in real time, but also copy with dynamic situations, and unpredictable interactions with the user.

The goal of a real time expert advisory system is not only to monitor the target system to detect, diagnose, and suggest a remedy for problems, but also to continue to advise the operator on further actions to take as the problem resolves. Functioning in a dynamic situation requires the ability to revoke or update remedial advice if the corresponding problem resolves of its own accord, or if the remedy is no longer appropriate to the situation. The advisory systems also should not rely on assumptions that problems have single causes, or that individual aspects of a problem situation, once resolved, will not reoccur.

The ability for an expert advisory system to function interactively with an operator is required, even if the system matures to the point people are willing to "close the loop" and allow it to exert control over the target system. This is because, in most applications, there will always be some actions that cannot be performed without human intervention (e.g., replacing broken parts, operating manual valves, etc.). Thus, the reasoning technique used by such systems must be able to cope with the unpredictability of operator behavior. The system cannot be based on assumptions that the operator will always approve and comply with recommended actions, respond to queries for information not obtainable through instrumentation, or even be available at the time advice is issued. In many application environments, it is also important that the advisory system not interact with the operator unnecessarily.

The invention is thus a reasoning technique which has been found suitable for providing the problem-monitoring and the advice-giving functions of a real time, interactive expert advisory system meeting the above requirements.

Prior art research involves a real time expert system for assisting in the management of a computer installation using the MVS operating system. This includes features added to a forward-chaining inference engine to handle the initiation of actions at the appropriate times, to manage communications among system components, and to exert controls that prevent sequences of remedial actions from being interrupted. However, that research does not involve methods for interrupting, retracting, or revising advice when it is appropriate to do so, nor for coordinating the treatment of multiple faults arising in the same episode.

A method for reasoning about multiple faults is involved in other research which addresses the problems of coping with very large search spaces comprised of combinations of failed components, and performing diagnostic reasoning from a model of the structure and function of the target system, in a static data environment. The invention herein focuses on managing diagnostic and remedial efforts over time, in a dynamic environment.

Other prior art has utilized a "response tree" technique as part of an expert systems to dynamically select among the possible responses that operators of a nuclear reactor might take in a failure situation. However, the main goal of this approach is to efficiently encode and utilize "precompiled" knowledge about responses that will lead to a safe system shutdown. The work herein has been in less critical application domains, and is directed toward methods to help operators keep a system functioning.

The technique herein serves as an adjunct to the inference engine of an expert advisory system in a similar manner as other prior art can serve as an adjunct to a deductive reasoner. The latter systems are used for problems in which the assertions given to the system are relatively unchanging; the elements of the problem space are inferences based on the givens plus additional assumptions which may later be found incorrect. Thus, dependencies of inferences on assumptions are recorded, so that when a contradiction is discovered, the inferences based on the contradictory set of assumptions are readily identified, and may be explicitly or implicitly "undone". The technique herein is appropriate for problems in which the assertions (data) given to the system change frequently; the elements of the problem space are states of affairs that are causally related, but which mayor may not hold given the next round of data. Thus, dependencies of the current problem state on antecedent causes are recorded, so that when the status of a cause changes, the effect on the overall course of the problem episode is readily identified.

PROBLEM ANALYSIS

Consideration of the type of behavior desired from an expert advisory system leads to several conclusions about the required features of the reasoning technique and knowledge representation to be used. Because the reasoning is to be performed in real time, and is to be about the status of a dynamic target system, the reasoning approach must utilize some form of multi-valued logic. At a minimum, logic predicates in the system must be permitted to take on an "unknown" value, as well as true/false, whenever the data involved is to obsolete to be considered a valid descriptor of the corresponding aspect of the target system. Likewise, the advisory system cannot halt and await a response from the user when the value of a non-instrumented variable is required; hence the reasoning approach must be able to proceed while some data values are unknown.

The reasoning technique must also be nonmonotonic, both in the "truth value" (t-nonmonotonic) and "knowledge" (k-nonmonotonic) sense. The world in which an expert advisory system functions is a t-nonmonotonic, in that the truth value of conclusions changes over time. For example, problem situations can spontaneously resolve (e.g., if a stuck valve frees itself), default assumptions can prove incorrect (e.g., a manual valve normally open may have been closed), or the operator of the system can resolve a problem independently of the advisory systems. As a result, the reasoning technique must be able to correctly "back up" in the stage of affairs concluded.

The advisory system's world is also k-nonmonotonic, because the amount of information known for certain to the system decays over time, as the data on which it is based ages. As a result, reasoning by an expert advisory system must be interruptible. The system cannot afford to suspend data scanning for an indefinite period of time until its inference engine reaches conclusions; data scanning and updates must occur regularly. Although data processes, the inference engine must operate on a stable "snapshot" of data, in order to ensure that the data it issuing, and hence its conclusions, are internally consistent. Thus, it must be possible to interrupt the reasoning process periodically to allow data updates to occur, then resume. Upon resumption, the reasoning process should not necessarily proceed to follow its prior reasoning paths, which may no longer be productive given the new data, lest it never reach useful conclusions at all, given the time slice it has available.

These considerations suggest that an effective reasoning approach for an advisory system is one based on a representation of the states a problem can attain during the problem-solving process. Transitions among these states should permit the system to proceed despite incomplete data whenever possible, and enable the system to handle "non-monotonic progress" through the problem-solving states. Nonmonotonic progress means, in this context, transitioning that returns to a previously visited state in the path from the start state to the final state in a problem episode.

Use of a representation of intermediate states in the problem-solving process makes the inference engine interruptible. The reasoning process can be suspended any time the representational structures are in an internally consistent condition. The problem-solving process will be responsive to data changes that occur during the problem-solving, since upon resumption, the next state transitions will be a function of the newly updated data. In contrast, for example, if a backward-chaining inference engine is interrupted for a data update, and its state (goal stack) saved and restored, the "line of reasoning" that the inferencing will initially pursue is still a function of the goal stack alone.

By defining the state transitions in a way that allows transitioning to occur in some parts of the problem despite unknown data values in other parts, the advisory system can proceed to offer some advice to the operator, even though it must await more data to draw conclusions about other aspects of the problem. As a practical matter, it has been found that if the applications domain involves problems in which the various potential contributors to a problem are weakly connected, (that is, the cause-effect connections from problems to their potential, underlying causes form more of a tree structure than a lattice), the advisory system can use a strict, three valued logic, and still generate useful advise while some desired data are unknown. Otherwise, it may be necessary to resort to a more complex logic approach, involving guesses and default values that are subject to later belief revision.

Finally, be defining a state transition network that allows cyclic paths to be followed during a problem episode, the t-nonmonotonic nature of problem-solving in dynamic situations (e.g., the possibility that a subproblem will reoccur within a given overall problem episode) is represented.

OBJECTS OF THE INVENTION

A main object of the invention is to provide a new and improved process monitoring system for continuously providing advice about the operation of a process, with said invention being a system which functions in real time and copes with dynamic problem developments.

Other objects and advantages of the invention will become apparent from the following description, appended claims and the attached drawings.

DRAWINGS

FIG. 1 is a table which shows the transition test of the invention herein which comprises steps for determining the state transitions to be undergone by a node.

TECHNIQUE USED

Figure 2:
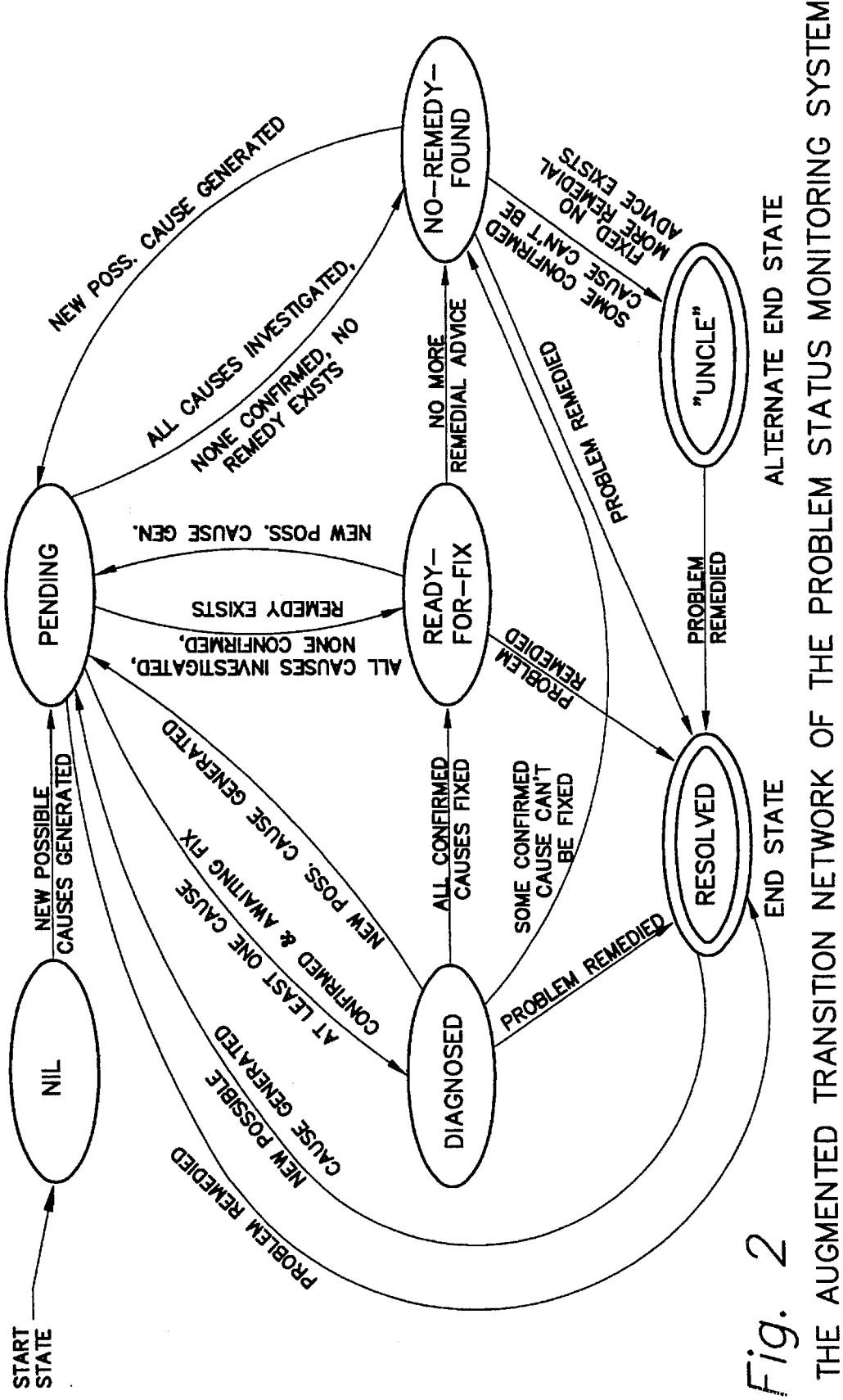
FIG. 2 shows an augmented transition network of the problem monitoring system according to the invention which illustrates the information contained in the eh table of FIG. 1.

The "problem status monitoring system" (PSMS) developed herein is for use in conjunction with an inference engine capable of detecting problem conditions and incrementally generating a hierarchical search space of possible antecedent causes or problems. These antecedent causes are the nodes of the search space; each node has associated with it a single state label from the set defined in PSMS (see below). It is assumed that the descendants of any given node or root problem in the search space, if found to be an actual cause of the root problem, must be remedied or otherwise rendered harmless before their ancestors can be remedied.

The PSMS approach is based on an augmented transition network, consisting of a set of state labels applied to each node of the search space as the problem-solving progresses, and lists attached as properties of the problem-solving (and remedying) with respect to that node's descendants. Problem nodes transition from state to state depend upon data, the knowledge base of the advisory system, and the status of these property lists. In turn, state transitions are augmented by actions that update the properties of a node's ancestors in the search space.

A node can be in one and only one state at any given time. The states, and their corresponding labels, are as follows:

nil: No problem-solving from this node has yet begun.

pending: The descendants of this node are under investigation, to be ruled in or out as actual causes of the current problem situation.

diagnosed: At least one of the descendents of this node has been confirmed as a cause of the current problem situation.

ready: All the descendents of this node that were confirmed as causes have been "fixed", hence, the cause represented by this node is ready to be remedied.

no-remedy: One or more descendants of this node has been confirmed as a cause, but no remedy has been effective, and/or no remedy for the cause represented by this node is known.

resolved: The cause represented by this node has been remedied, or ruled out as a contributor to the current problem situation.

uncle: The cause represented by this node has been confirmed as a cause, but no remedy has been found; the advisory system cannot help the user with this aspect of the problem.

Four lists are attached as properties to each node of the problem space. These lists are the list of "confirmed", "rejected", "fixed", and "can't be fixed" descendents of the node. If a node is confirmed as a contributing cause of the problem situation, it is entered on its parents' "confirmed" lists. It may be noted that a node may have more than one immediate parent in the problem space. Conversely, if the node is rejected as a contributing cause, it is entered on its parents' "rejected" lists. Likewise, once a node is confirmed, if the cause it represents in the application domain is remedied, the node is entered on its parents' "fixed" lists. Alternatively, if the advisory system exhausts its supply of recommendations to the user, and the cause remains problematic, the corresponding node is entered on its parents' "can't-be-fixed" lists. The management of these lists obeys the following four constraints:

(1) Set-Union (Confirmed, Rejected) (descendants)

(2) Set-Intersection (Confirmed, Rejected)=null (3) Set-Union (Fixed, Cant-be-fixed) (confirmed)

(4) Set-Intersection (Fixed, Cant-be-fixed)=null

The test to determine the state transition to be undergone by a node in the problem space involves both the advisory system's knowledge base, and the status of these property lists. This transition test consists of a maximum of seven steps, as follows. (The letters in brackets [ ] correspond to the rows of the state transition table found in the table which is the subject of FIG. 1).

1. The inference engine is called upon to determine whether the problem (cause, represented by node has been remedied; if so [A], the node transitions to Resolved.

2. Otherwise, if new direct descendants of the node can be generated [B], they are added, and the node transitions to Pending.

3. Otherwise, if some of the node's descendents are not on either its Confirmed or Rejected lists [C], no transition is made; (the jury is still out on some antecedent causes).

4. Otherwise, if the node's Confirmed list is empty, then if the knowledge base contains some remedial advice associated with this node [D], transition to Ready; else [E] transition to No-Remedy.

5. Otherwise, if not all members of the node's Confirmed list are on either its Fixed or Can't-be-fixed lists [F], the node is labeled Diagnosed; (we've confirmed at least one cause, but we're still waiting for some antecedent cause to be remedied).

6. Otherwise, if the node's Can't-be-fixed list is not empty [G], and the node is not already labeled No-Remedy, transition to No-Remedy; else, transition to Uncle.

7. Otherwise, if the knowledge base contains some remedial advice associated with this node, transition to Ready [H]; else [I] if the node is not already labeled No-Remedy, transition to No-Remedy; otherwise, transition to Uncle.

By defining the state transition network to include a No-Remedy state as a "way-station" on the way to the Uncle state, a "hook" is provided allowing the advisory system to have a second chance at problem-solving before "giving up". This is useful if an initial attempt at problem solving without involving querying of the user is desirable, to avoid unnecessary interaction with the user.

The table of FIG. 1 summarizes the PSMS state transition table. Entries in this table indicate the resulting state that a node assumes, based on its current state (column), and the result of the above test (row). The state transitions are augmented by actions to update the property lists of the nodes' parents. Whenever a node transitions from Pending to Resolved, it is entered on its parents' Rejected lists, as this corresponds to "ruling out" the associated cause as a culprit in the current problems. Whenever a node makes a transition from Pending to any other state except Resolved, it is entered on its parent's Confirmed lists, as it is now known to be a contributor to the problem situation. Similarly, a transition of a node to Resolved from any state (other than Pending) causes it to be entered on its parents' Fixes lists. Any transition to the No-Remedy state causes the node to be entered on its parents' Can't-be-fixed lists. The effect of these actions is to propagate findings about all causes of the problem situation, and readiness for remedial action, from the fringe to the root of the problem search space lattice. To the extent that this lattice is weakly interconnected, progress in problem-solving and advice-giving can proceed along one path from fringe to root, even while other paths are awaiting the results of further data collection and inferencing.

The transition from the Ready state back to itself (row H) is notable. It is here that the advisory system can issue additional advice to the operator regarding how to remedy the corresponding problem, since presumably any previously issued advice has been ineffective (else the transition in row A, to Resolved, would have occurred).

The ability of PSMS to support nonmonotonic progress in problem-resolution is based on row B of the state transition table. This row indicates that at any point in a problem episode, a node may transition "back" to the pending state. This transition is augmented as follows: When returning to the Pending state, the node is removed from its parents' property lists. If as a result, a parent's Confirmed list becomes empty, that parent transitions to the Pending state, and the updating of property lists proceeds recursively toward the root of the problem lattice. Otherwise, the parent transitions to the Diagnosed state. Unlike the other state transitions in PSMS, this series of propagated transitions must be uninterrupted in order for the representation to be internally consistent. (Otherwise, for example, the parent might remain in a Diagnosed state even though none of its direct descendents are now Confirmed). However, the propagation may be accomplished in Order (n log n) time, where n is the number of nodes in the problem lattice. Thus, this poses little difficulty for practical real time applications. Of course, if an upper bound for n in the application domain is known, an upper bound for an invocation of PSMS can be determined.

The reasoning technique of PSMS has a type of completeness property that is useful in advisory systems. Assuming that the inference engine it is used with employs a logically complete method for generating the search space and diagnosing individual causes, the PSMS approach assures that if advice to the user is need and available in the knowledge base, the advice will be issued. Likewise, if no advice for the problem situation exists in the knowledge base, the user will be informed of that fact. Justification for these claims follows from inspection of the state-transition network: PSMS will cause the advisory system to generate pertinent advice when it exists, so long as there is no path to the Uncle state for nodes that have advice associated with them except through the Ready state. The table of FIG. 1 shows there is no path to Uncle except through No-Remedy, and while there are paths into the No-Remedy state from Pending, Diagnosed, and Ready, rows D and H of the table show that there is no path from nodes with advice associated with them to the No-Remedy state except through the Ready state. Similarly, as long as advice to the user is needed (i.e., a problem node hasn't entered the Resolved state), the node will not enter the Uncle state except through the No-Remedy state, at which point the user can be notified that the knowledge base contains no further pertinent advice for the problem.

SYSTEM IMPLEMENTATION

A PSMS component has been included in a real time expert advisory system which has been implemented and installed in the control room of a factory of a major manufacturer of consumer products. The expert system is interfaced to the plant's process control computer, and obtains on-line sensor data from the manufacturing process on a continuous basis. The expert system monitors these data, detects emerging problems with the manufacturing process, and advises the operator regarding actions to take to avoid or recover from them. It then continues to monitor the process, updating and/or retracting advice as the problem situation evolves. The expert system monitors and provides advice on four parallel manufacturing lines, simultaneously.

The system is currently implemented in Zetalisp on a Symbolics computer. The operator interface, data collection component, and inference engine (with embedded PSMS component) run as separate processes, passing messages and data among them. The amount of process data being scanned by the system varies with the state of the manufacturing process; typically, 60– 70 data points are being monitored at any given time. Within the inference engine process, the main tasks are emptying the input data buffer from the data collection component, monitoring the manufacturing process for emerging problems, and advancing the problem-solving process (including advancing each problem node through a state transition). On the average, these tasks require 900, 477 and 530 milliseconds, respectively, for a total top-level inference engine cycle of about 2 seconds.

In the manufacturer's application domain, a typical problem search space (lattice) is hierarchically 2 to 5 plies deep from a detected root problem to "ultimate" cause. Generating one ply per inference engine cycle, and allowing for the 2 to 3 transitions required for a node to reach the Ready state, the typical amount of processing from root problem detection to the first advice to the operator is 4 to 8 inference engine cycles. Thus, if the inference engine had exclusive use of the machine, its "reaction time" to problems would be 8 to 16 seconds. In practice, a multiple second delay was deliberately built into the inference engine cycle to guarantee other processes (operator interface, incremental garbage collection, etc.) ample time to run, yielding a reaction time of about 30 to 60 seconds. This speed is sufficient for the manufacturing application involved.

Figure 3:
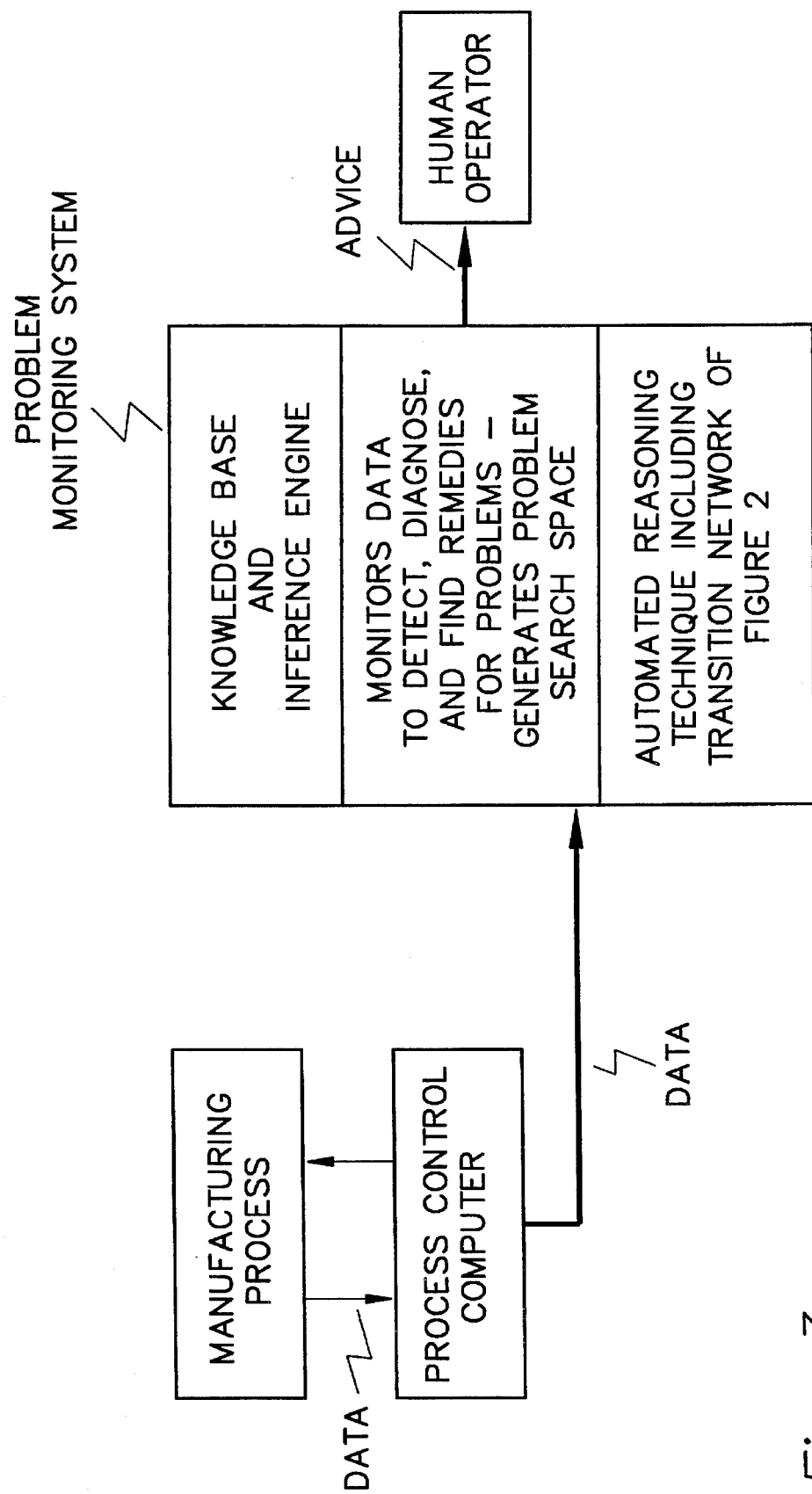
FIG. 3 is a flow diagram illustrating an embodiment of the invention.

FIG. 3 is a block diagram showing the problem monitoring system in relation to the manufacturing process to be monitored and a human operator thereof.

Figure 4:
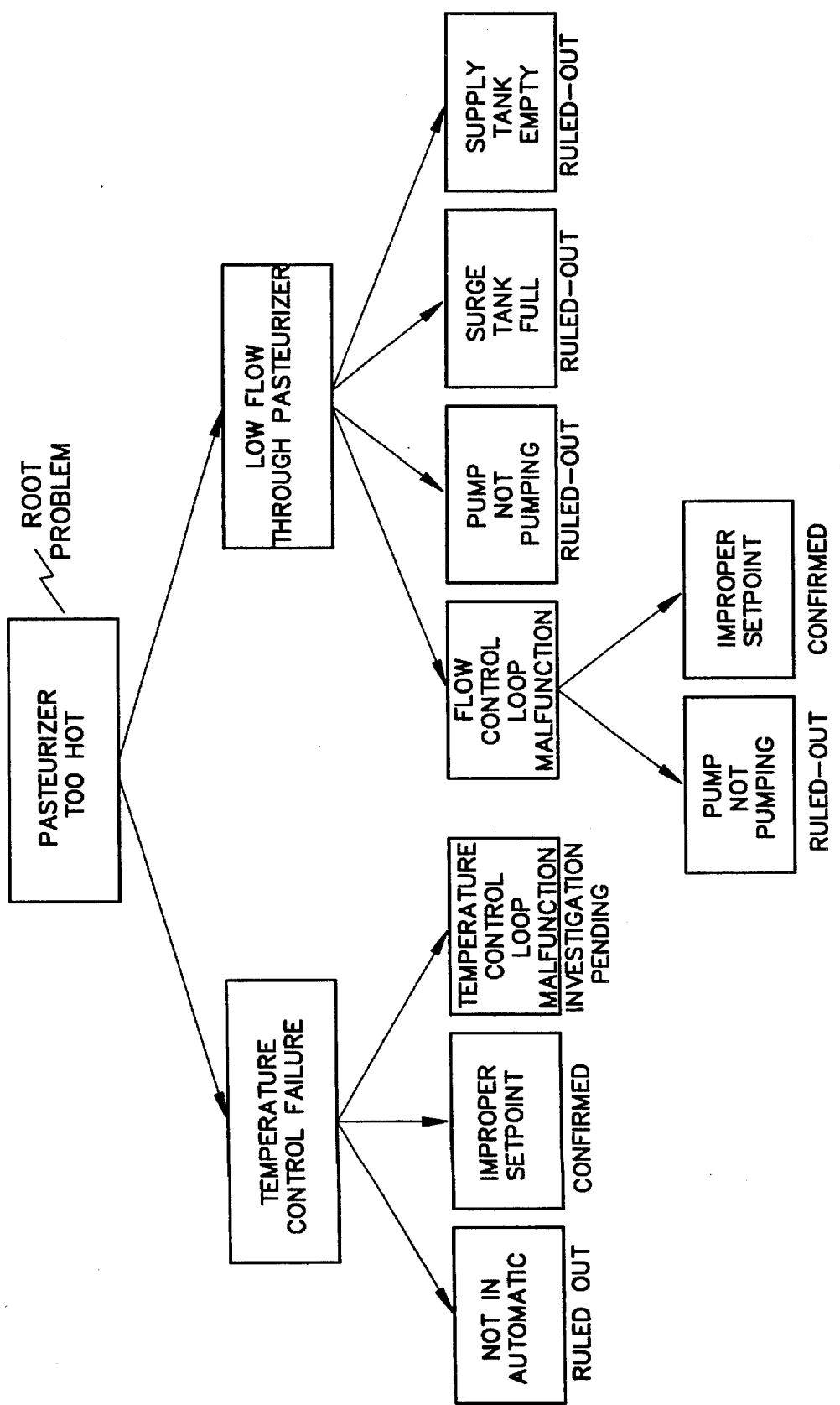
FIG. 4 is a block diagram of an example of a problem search space in accord with the preferred embodiment of the invention.
Figure 5A:
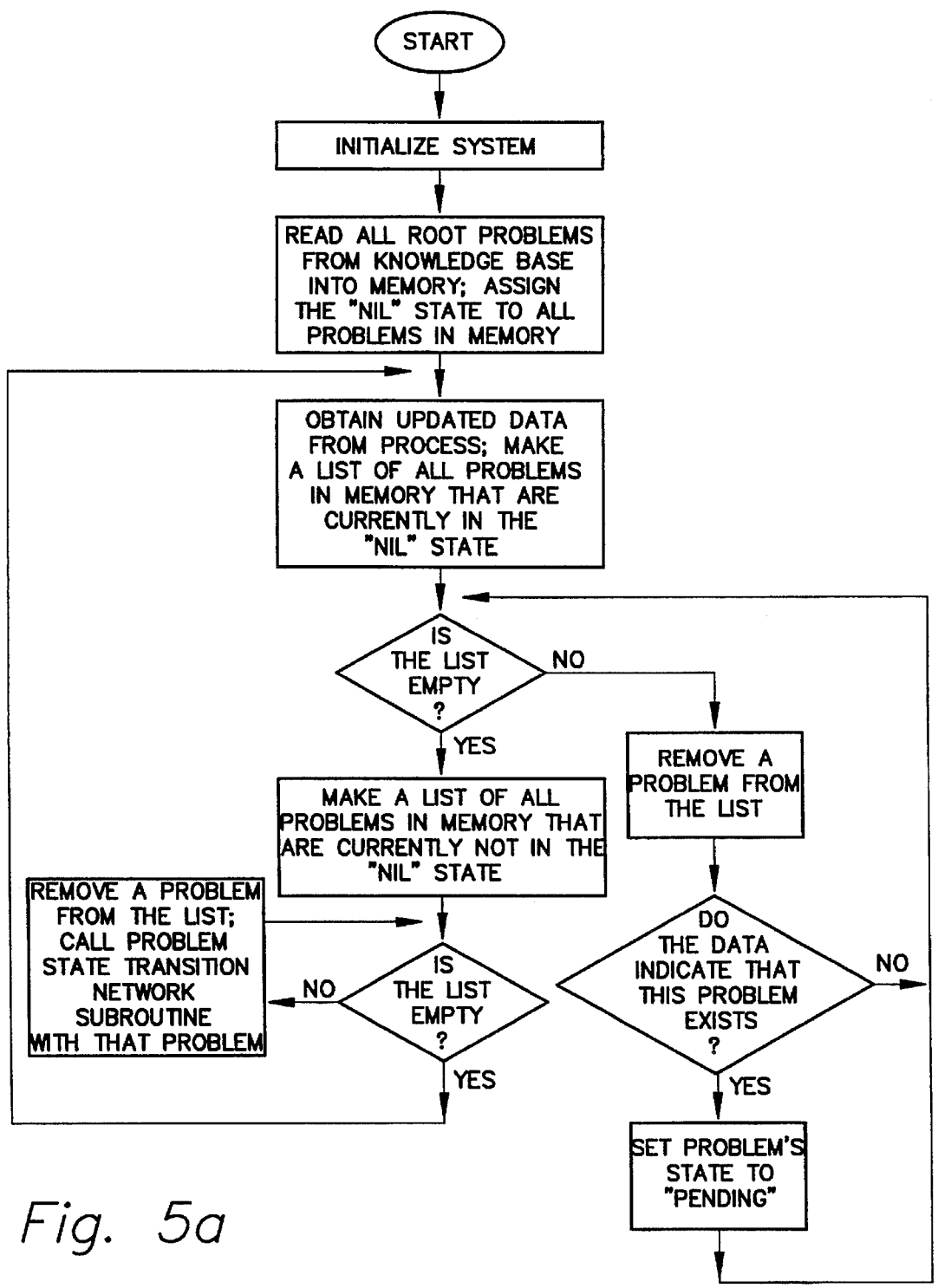
FIGS. 5a–5e show a flow chart of the method of embodying the invention.
Figure 5B:
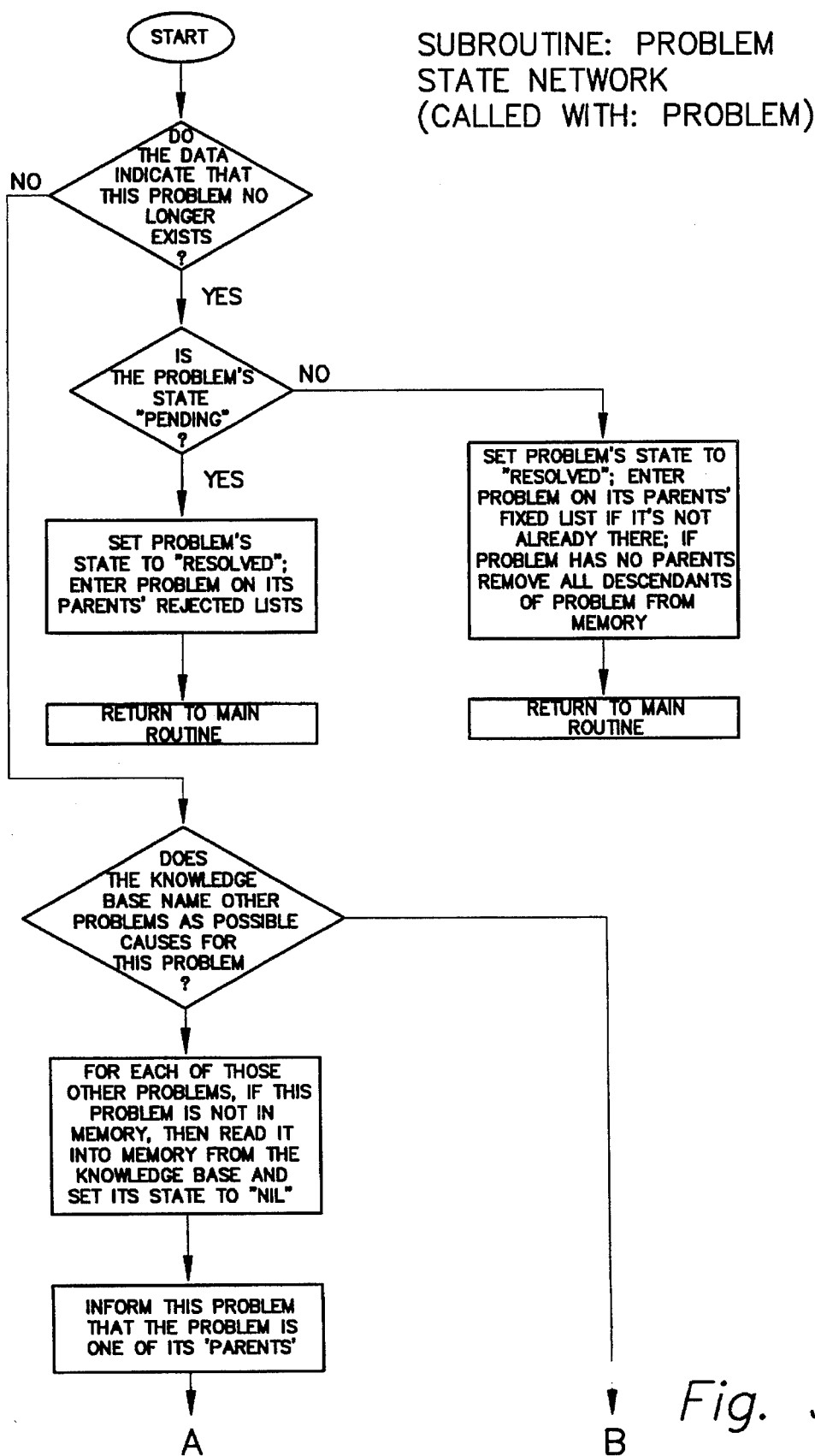
Figure 5C:
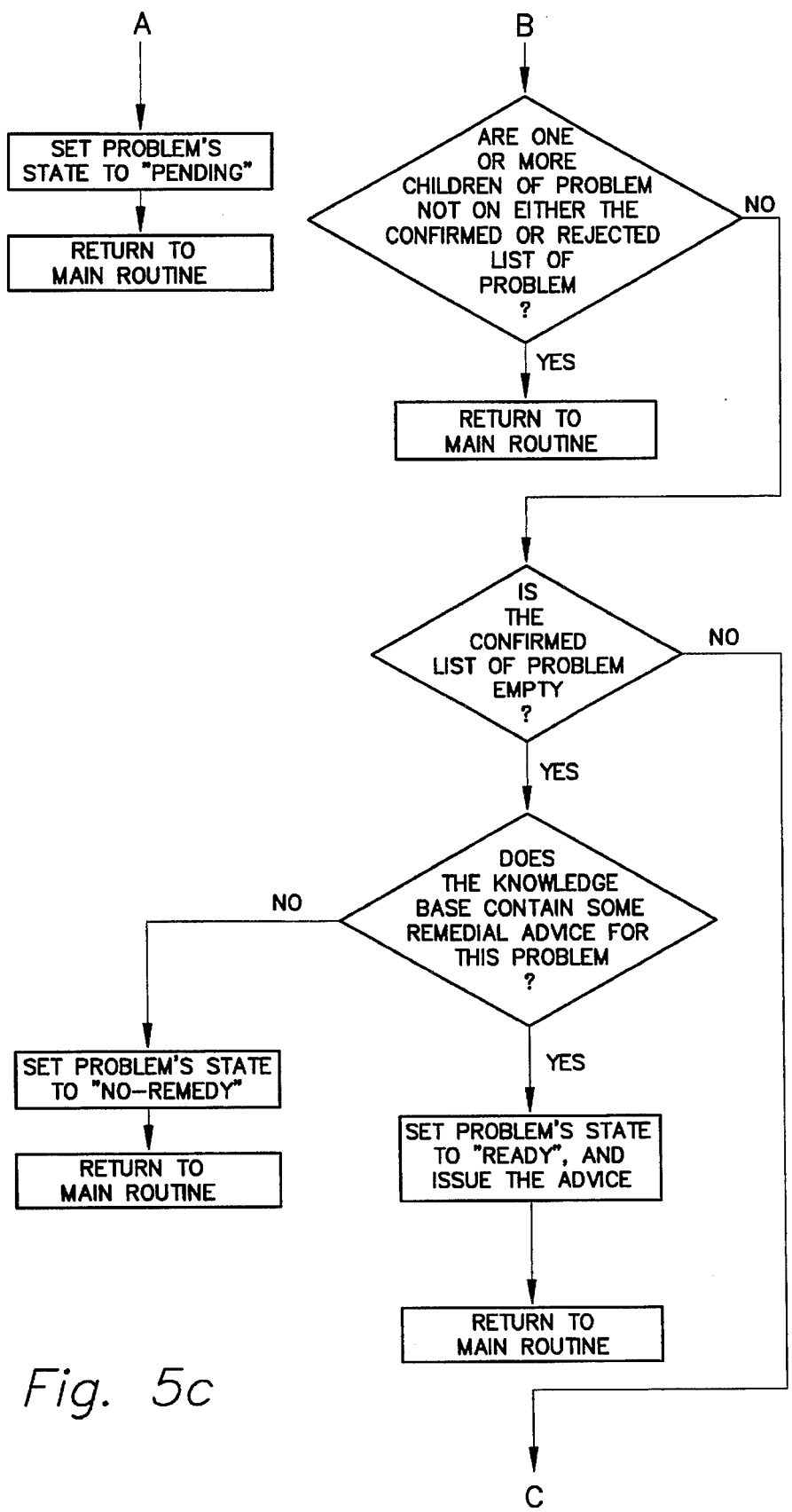
Figure 5D:
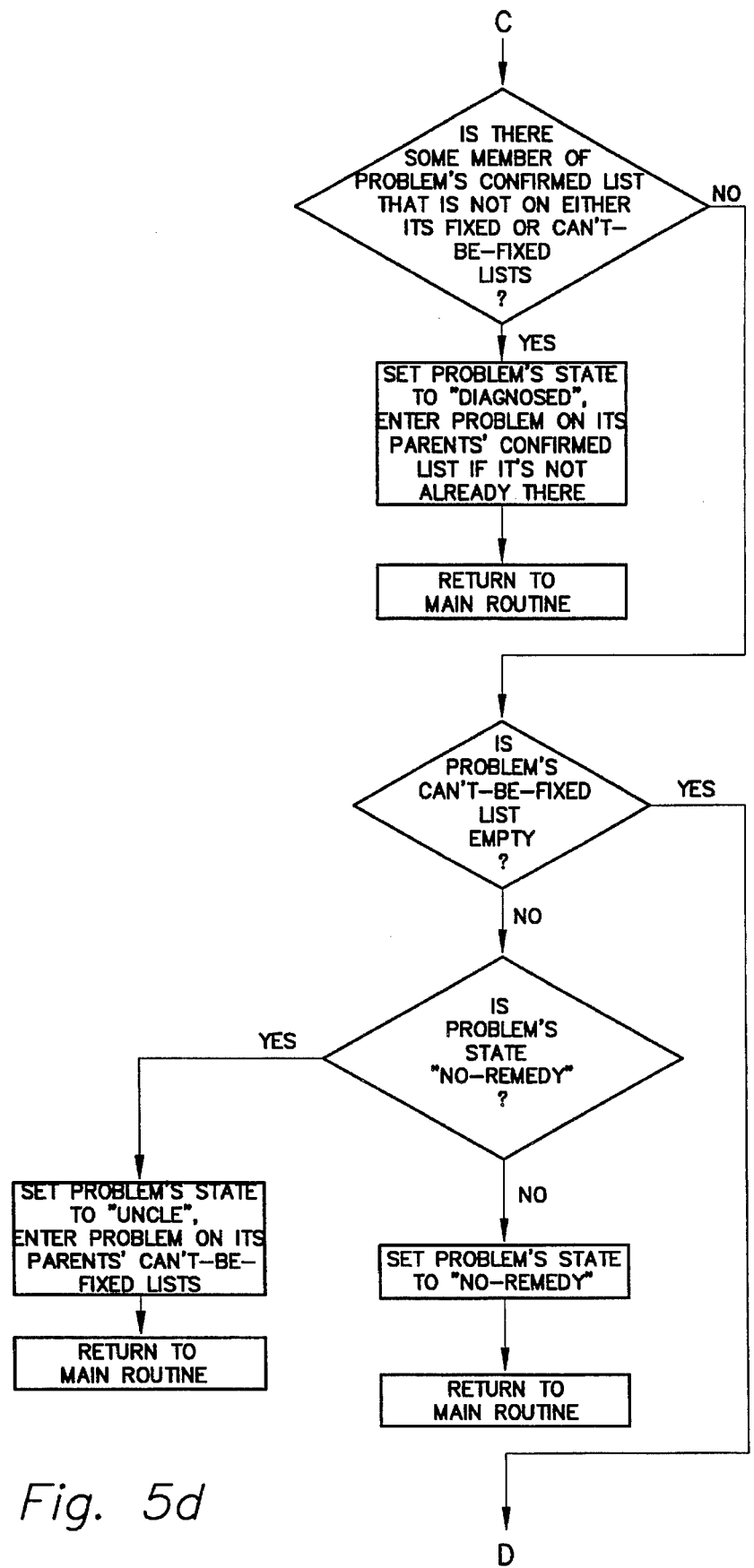
Figure 5E:
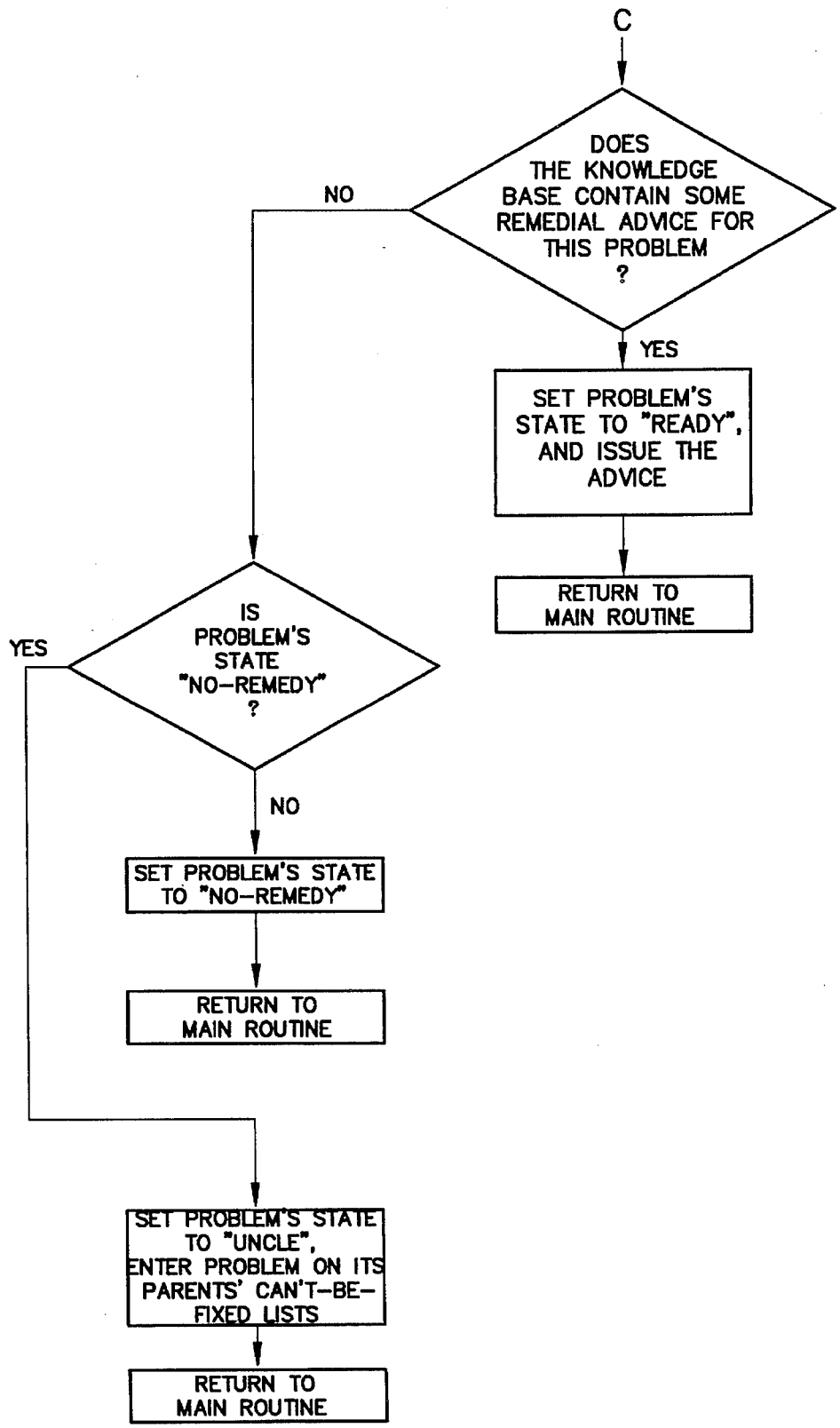

In the illustrated problem search space of FIG. 4, a typical prior art expert system will have a knowledge base which will check out each of the potential problems represented by the nodes by processing sensed data to determine (1) if in fact each potential problem is an actual problem and (2) if so, to determine if a solution to the problem can be derived from the knowledge base.

What the invention herein does is to apply the state transition diagram of FIG. 2 to each one of the problem nodes of the illustrative problem space of FIG. 4.

A computer program incorporating the above referred to seven step transition test would operate to apply the state diagram of FIG. 2 to each problem node. The actual analyzing of each problem node of FIG. 4 to make a determination as to whether or not it is an actual problem would be in accordance with prior art procedure but it is that determination which, in accordance with the invention herein, governs the state of the node relative to the state diagram of FIG. 2.

A program in accordance with the invention herein would start by identifying mode A as a root problem which would then be placed in the pending state. A problem search space (FIG. 4) would be generated and each of the descendant problem nodes would be assigned a pending state and be put under investigation. The investigation of each mode to determine if it is at least one actual cause of the problem of node A would be done in accordance with prior art principles.

The nodes further from the node A would be investigated first and these would be the nodes C, D and E in the left branch, or the nodes F and G in the right branch. The legends at the bottom of these modes indicate, by way of illustration, the possible results of the investigations and states are assigned to the nodes in accordance with the investigations and in accordance with the invention.

The above explanation is not intended to be a complete description of the invention but only to illustrate in a general way the application of the diagram of FIG. 2.

A flowchart shown in FIGS. 5A to 5E and the following flowchart are flowcharts in more formalized form, with each being essentially equivalent in content to the above referred to seven step transition test.

---

FLOWCHART SHOWING HOW A PRIOR ART
INFERENCE ENGINE WOULD MAKE USE OF THE
PROBLEM STATE TRANSITION NETWORK OF THE
INVENTION AS A SUBROUTINE.

---

Main Routine: Inference Engine

```
initialize system;
read all root problems from knowledge base into memory;
assign the NIL state to all problems in memory;
1:     loop "forever";
       obtain updated data from process;
       make a list of all problems in memory that are
       currently in the NIL state;
   2:  is the list empty?
       if no, then
              remove a problem from the list;
              do the data indicate that this problem
              exists?
                  if yes, then
                      set this problem's state to
                      PENDING
                      go to 2:
                  if no, then
                      just go to 2:
       if yes, then
              just go to 3:
   3:  make a list of all problems in memory that
       are currently not in the NIL state;
   4:  is the list empty?
       if no, then
```

FLOWCHART SHOWING HOW A PRIOR ART
INFERENCE ENGINE WOULD MAKE USE OF THE
PROBLEM STATE TRANSITION NETWORK OF THE
INVENTION AS A SUBROUTINE.

```
                    remove a problem from the list;
                    call Problem State Transition Network
                    subroutine with that problem
                    go to 4:
                    if yes, then go to 1:
End Main Routine
Subroutine: Problem State Transition Network (called
with: Problem)

1:      do the data indicate that this Problem no longer
        exists?
        if yes, then
                if Problem's state is PENDING
                    then
                            set Problem's state to RESOLVED
                            enter Problem on its parents'
                            Rejected lists
                            return to main routine.
                    otherwise
                            set Problem's state to RESOLVED
                            enter Problem on its parents' Fixed
                            lists if it's not already there
                            if Problem has no parents
                                then remove all descendants of
                                Problem from memory
                            return to main routine.
                    end if
                otherwise go to 2:
2:      does this knowledge base name other problems as
        possible causes for this Problem?
        if yes, then
                for each of these other problems
                    if this other problem is not in
                    memory
                            read it into memory from the
                            knowledge base
                            and set its state to NIL
                            end if
                            inform this other problem that the
                            Problem is one if its "parents"
                    end for
                    set Problem's state to PENDING
                    return to main routine.
                otherwise, go to 3:
3:      are one of more children of Problem not on either
the Confirmed or the Rejected list of Problem?
        if yes, then
                just return to the main routine
        otherwise, go to 4:
4:      is the Confirmed list of Problem empty?
        if yes, then
                if the knowledge base contains some remedial
                advice for this Problem
                    then set Problem's state to READY, and
                    issue the advice
                    else set Problem's state to NO-REMEDY
                return to main routine
        otherwise, go to 5:
5:      is there some member of Problem's confirmed list
that is not on either its Fixed or Can't-Be-Fixed
lists?
        if yes, then
                set Problem's state to DIAGNOSED
                enter Problem on its parents' Confirmed list
                if it's not already there
                return to the main routine
        otherwise, go to 6:
6:      is Problem's Can't-Be-Fixed list non-empty?
        if yes, then
                if the Problem's state isn't NO-REMEDY
                    then
                            set Problem's state to NO-REMEDY
                            return to main routine
                    else
                            set Problem's state to UNCLE
```

FLOWCHART SHOWING HOW A PRIOR ART
INFERENCE ENGINE WOULD MAKE USE OF THE
PROBLEM STATE TRANSITION NETWORK OF THE
INVENTION AS A SUBROUTINE.

```
                            enter Problem on its parents'
                            Can't-Be-Fixed lists
                            return to main routine
                    end if
                otherwise, go to 7:
7:      does the knowledge base contain some remedial
advice for this Problem?
        if yes, then
                set Problem's state to READY, and issue the
                advice
                return to main routine
        otherwise,
                if the Problem's state is not NO-REMEDY
                    then set Problem's state to NO-REMEDY
                    else
                            set Problem's state to UNCLE
                            enter Problem on its parents'
                            Can't-Be-Fixed lists
                    end it
                    return to main routine
end of Problem State Transition Network subroutine.
```

COMMENTS AND CONCLUSION

A Problem-State Monitoring System, presented herein, consists of an augmented transition network of problem states, useful as an adjunct to inference engines for real time expert advisory systems. The defined transitions allow the system to model a real time problem resolution process, even if it follows a nonmonotonic course with subproblems reoccurring in the same episode. Also, the PSMS approach supports the requirement that an advisory system be capable of updating its recommendations in real time, retracting advice that has become unnecessary.

Coupled with the ability to interrupt and resume the problem-solving process, the existence of cyclic paths in the transition network allows PSMS to model reoccurring problems. However, this situation also could lead to undesirable cycles in advisory system behavior, with the advisory system repeatedly recommending remedial actions that only temporarily manage a persistent problem. This behavior has not been observed in our application. However, an interesting direction for further research might be to extend the PSMS approach with a meta-level reasoning component to detect cycles and produce advice for resolving the problem on a more permanent basis. Such a system could be one more step toward the goal of a genuinely "expert" assistant to process operators.

It is claimed:

1. An expert system for diagnosing and providing remedies for problems in a controlled system, said controlled system having a plurality of data points from which said problems may be determined and said expert system comprising a set of nodes, each node comprising at least four necessary elements:

a state holder means, having an indication of the state of the node, for communicating the state of the node to other nodes;

an immediate descendant tally means for holding a representation of state information of all direct descendant nodes relative to the node having said tally means, and for providing an indication of whether said direct descendant has been "confirmed" or "rejected" as a cause of said problem;

test means for determining whether said node has a problem by referencing an information holder;

algorithmic mechanism means for performing the activities of said node; and, at least a select one of the following additional elements:

an advice list means, having a list of advice members, for solving a problem and providing a flag for each member of the advice list indicative of whether a particular advice member has been given advice currently, a communications link means for transferring advice to an entity that monitors or controls the controlled system, and an information holder means connected to an information generating device for indicating the state of the information generating device; and wherein the algorithmic mechanism means element of each node comprises means for:

A. Determining whether the problem has been remedied; if so, transitioning to a "Resolved" state, B. Otherwise, if new direct descendants of the node can be generated, adding them to said tally means and transitioning the node to a "Pending" state, C. Otherwise, if more than zero of the node's descendants are not either in a "Confirmed" or a "Rejected" state, no transitioning is made, D. Otherwise, if the node has no descendants in a "Confirmed" state, then if the node has an advice list which contains some remedial advice associated with said node, transitioning the node to a "Ready" state; else transitioning the node to a "No-Remedy" state, E. Otherwise, if more than zero of the nodes which are in the "Confirmed" state are furthermore in either a "Fixed" or a "Can't-be-Fixed" state, transitioning the node to a "Diagnosed" state, F. Otherwise, if the node has direct descendants in the "Can't-be-Fixed" state, and the node is not already transitioned to the "No-Remedy" state, transitioning said node to the "No-Remedy" state; if not then transitioning said node to an "Uncle" state, and, G. Otherwise, if the advice list contains some remedial advice associated with this node, transitioning the node to the "Ready" state unless the node is not already transitioned to the "No-Remedy" state, in which case transitioning the node to the "No-Remedy" state; otherwise, transitioning the node to the "Uncle" state.

\* \* \* \* \*